United States Patent
Yasuda et al.

(10) Patent No.: US 12,117,540 B2
(45) Date of Patent: Oct. 15, 2024

(54) SYSTEMS AND METHODS FOR IMPROVING LOCALIZATION ACCURACY BY SHARING MUTUAL LOCALIZATION INFORMATION

(71) Applicant: TOYOTA RESEARCH INSTITUTE, INC., Los Altos, CA (US)

(72) Inventors: Hiroshi Yasuda, San Francisco, CA (US); Manuel Ludwig Kuehner, Mountain View, CA (US); Alexander Christoph Schaefer, Heuweiler (DE)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 422 days.

(21) Appl. No.: 17/517,850

(22) Filed: Nov. 3, 2021

(65) Prior Publication Data

US 2023/0134107 A1 May 4, 2023

(51) Int. Cl.
*G01S 19/43* (2010.01)
(52) U.S. Cl.
CPC .................................. *G01S 19/43* (2013.01)
(58) Field of Classification Search
CPC .......... G01S 5/0072; G01S 5/16; G01S 19/14; G01S 19/43; G01S 19/485; G01S 2013/9316
See application file for complete search history.

(56) References Cited

U.S. PATENT DOCUMENTS

| | | | |
|---|---|---|---|
| 9,883,354 B2 | 1/2018 | Moebus | |
| 10,757,485 B2 | 8/2020 | Al-Stouhi | |
| 2013/0143591 A1* | 6/2013 | Silny | G01S 5/0072 455/456.1 |
| 2013/0338868 A1 | 12/2013 | Essame | |
| 2018/0329411 A1 | 11/2018 | Levinson | |
| 2018/0348789 A1 | 12/2018 | Abeling | |
| 2019/0069052 A1* | 2/2019 | Al-Stouhi | H04W 4/46 |
| 2019/0220003 A1 | 7/2019 | Sharma | |
| 2020/0003907 A1* | 1/2020 | Eriksson | G01S 5/0072 |
| 2020/0200546 A1 | 6/2020 | Anirudh | |
| 2021/0063546 A1* | 3/2021 | Slobodyanyuk | G01S 13/91 |
| 2021/0141100 A1* | 5/2021 | Castorena Martinez | G01S 5/0072 |
| 2021/0263166 A1* | 8/2021 | Zheng | G01S 19/256 |
| 2022/0371602 A1* | 11/2022 | Pan | G01S 17/86 |

* cited by examiner

*Primary Examiner* — Dale Moyer
(74) *Attorney, Agent, or Firm* — SHEPPARD, MULLIN, RICHTER & HAMPTON LLP; Daniel N. Yannuzzi

(57) ABSTRACT

Systems and methods are provided for improving a localization estimate of a vehicle by leveraging localization estimates of surrounding vehicles. A vehicle may estimate its own location relative to a global reference frame. The vehicle may identify nearby vehicles. The vehicle may estimate the location of the nearby vehicles. The vehicle and nearby vehicles may generate and exchange localization packets containing information about the vehicles and the location estimates. The vehicle may refine its localization estimate based on received localization packets.

20 Claims, 7 Drawing Sheets

LOCALIZATION PACKET 600, 612, 614, 616

Vehicle Coordinate Frames 602 full or partial license plate, center of wheel, center of axle, center of front end, center of rear end, etc.

Vehicle Identification Information 604 license plate number, registration number, make, model, color, number of axles, condition, etc.

Global Reference Frame 606 center of the Earth, landmark, center of city, center of country, preselected location on map, preselected location on coordinate plane, etc.

Global Location 608 coordinates (relative to global reference frame) expressed as degrees, minutes, seconds, degrees and decimal minutes, decimal degrees, etc. with accompanying uncertainty level

Relative Location 610 coordinates (relative to global reference frame) expressed as degrees, minutes, seconds, degrees and decimal minutes, decimal degrees, etc. with accompanying uncertainty level

FIG. 5

SYSTEMS AND METHODS FOR IMPROVING LOCALIZATION ACCURACY BY SHARING MUTUAL LOCALIZATION INFORMATION

TECHNICAL FIELD

The present disclosure relates generally to systems and methods for improving the localization accuracy of a vehicle, and in particular, some implementations may relate to using localization estimates of surrounding vehicles to improve a localization estimate.

DESCRIPTION OF RELATED ART

Accurately determining the location of a vehicle is an important task for many applications including navigation, advanced driver-assistance systems (ADAS), and autonomous driving. Localization refers to determining both the position and the orientation of a vehicle with respect to a reference frame, for example the origin of a selected map or the center of the Earth. Other reference frames are possible.

Existing approaches to localization include satellite-based localization with base stations on the ground. For example, a base station may average GPS indications of the localization of a vehicle or vehicles over time to formulate a precise estimate of a vehicle or vehicles' location. Real-time kinematic (RTK) positioning is an example of this kind of localization method that leverages a base station and one or more GPS receivers to determine a vehicle localization. The base station takes satellite measurements and then transmits the satellite measurements to the receivers in order to enable them to enhance localization precision. This approach is only effective, however, when a base station is nearby and available for communication.

Another existing approach to localization is map-based localization. This can be performed by detecting certain static landmarks and measuring a vehicle or vehicles' location relative to the landmarks using sensors. Static landmarks may include poles, street signs, traffic signals, lane markings, and other physical markings and structures. Sensors may include LIDAR sensors and cameras. This approach only works when there is a pre-constructed map of an area available.

Both the map-based and satellite-base station approaches are not effective in certain environments, for example in an "urban canyon" or other environments, because these approaches rely on satellite connectivity and communication and/or the availability of a pre-constructed map with identified landmarks. Additionally, autonomous applications require a high degree of accuracy for localization compared to other applications, such as navigation. The above methods and other existing methods of localization may not achieve the type of high accuracy localization needed to support autonomous applications.

BRIEF SUMMARY OF THE DISCLOSURE

According to various embodiments of the technology disclosed herein are systems and methods for improving localization accuracy of a target vehicle. A method for improving localization accuracy of a target vehicle may include estimating the locations of vehicle coordinate frames for a first vehicle relative to a global reference frame, identifying a second vehicle proximate to the first vehicle, estimating the locations of vehicle coordinate frames for the second vehicle relative to the global reference frame, and receiving a localization packet from the second vehicle. A localization packet may include, for example, several types of information including vehicle identification information, estimated localizations for a given vehicle or vehicles, uncertainty ranges for estimates, and any other useful information. The localization packet may be generated by the second vehicle based on the second vehicle's estimated location of the vehicle coordinate frames for the first vehicle and the second vehicle. The method may also include refining the estimate of the location of the target vehicle.

In a method for improving localization accuracy of a target vehicle, the target vehicle may be the ego vehicle and refining the estimate of the location of the target vehicle may include refining the estimate of vehicle coordinate frames for the ego vehicle relative to a global reference frame based on a second localization packet received from a proximate vehicle.

In another embodiment in a method for improving localization accuracy of a target vehicle, the target vehicle may be a proximate vehicle and refining the estimate of the location of the target vehicle may include refining the estimate of vehicle coordinate frames for the target vehicle relative to a global reference frame based on a second localization packet received from another proximate vehicle.

In such a method, vehicle coordinate frames may include the center of a vehicle's license plate, the center of a vehicle's wheel, or some other coordinate frame. In such a method, a global reference frame may include the origin of a selected coordinate plane, the center of the Earth, or some other global reference frame. In such a method, transmitting a generated localization packet to a proximate vehicle may be accomplished by transmitting the generated localization packet using vehicle-to-vehicle (V2V) communications. In such a method, transmitting the generated localization packet to a proximate vehicle may also be accomplished using Wi-Fi.

A method for improving localization accuracy of a target vehicle may also include generating a first localization packet based on the estimated location of the vehicle coordinate frames for a first vehicle and a second vehicle and transmitting the generated first localization packet to the second vehicle.

A method for improving localization accuracy of a target vehicle may also include identifying additional vehicles proximate to the first vehicle, estimating a location of vehicle coordinate frames for each additional vehicle relative to the global reference frame, generating a first localization packet based on the estimated location of the vehicle coordinate frames for the first vehicle, second vehicle, and additional vehicles, transmitting the generated first localization packet to the second vehicle and additional vehicles, receiving additional localization packets from each additional vehicle, wherein the additional localization packets are generated by the additional vehicles based on the additional vehicles' estimated location of the vehicle coordinate frames for the first vehicle, second vehicle, and additional vehicles, and refining the estimate of the location of the target vehicle.

A method for improving localization accuracy of a target vehicle may also include determining which vehicle, among the first vehicle, second vehicle, and additional vehicles, is best equipped to accurately determine the vehicle coordinate frame of the target vehicle, affording greater weight to the localization estimate of the vehicle best equipped to accurately determine the vehicle coordinate frame of the target vehicle, and refining the estimate of the location of the target vehicle based on the weighted first, second, and additional localization packets.

A method for improving localization accuracy of a target vehicle may also include repeating the determination of which vehicle, among the first vehicle, second vehicle, and additional vehicles, is best equipped to accurately determine the vehicle coordinate frame of the target vehicle, affording greater weight to the localization estimate of the vehicle best equipped to accurately determine the vehicle coordinate frame of the target vehicle, and again refining the estimate of the location of the target vehicle based on the weighted first, second, and additional localization packets. A method for improving localization accuracy of a target vehicle may also include transmitting the refined estimates of the location of the target vehicle in real-time to connected vehicles.

A localization system may include a first vehicle. The first vehicle may be equipped with advanced driver-assistance systems (ADAS), able to estimate its location, and able to communicate with other vehicles. A localization system may also include a second vehicle identified by the first vehicle as proximate to the first vehicle. The second vehicle may be equipped with ADAS, able to estimate its location, and able to communicate with other vehicles. In such a system, the first vehicle may estimate its location relative to a common reference for both the first vehicle and the second vehicle. In such a system, the second vehicle may estimate its location relative to a common reference for both the first vehicle and the second vehicle.

A localization system may also include a first localization packet. The first localization packet may be generated by the first vehicle based on the estimated locations of the first vehicle and the second vehicle. A localization system may also include a second localization packet. The second localization packet may be generated by the second vehicle based on the estimated locations of the first vehicle and the second vehicle. In such a system, the first and second vehicles may exchange the first and second localization packets. In such a system, the first and second vehicles may each refine their estimated locations for both the first vehicle and the second vehicle based on the received localization packets.

In a localization system, the estimated coordinate frames of the first and the second vehicles including the first and second localization packets each may include an uncertainty range. In a localization system, the first and second vehicles may take the uncertainty ranges into account in refining their estimated coordinate frames for both the first vehicle and the second vehicle based on the received localization packets.

A localization system may also include GPS receivers. The GPS receivers may support real-time kinematic (RTK) positioning. The system may cross reference localization packets with localization estimates determined by the GPS receivers to refine localization estimates.

A localization system may also include pre-constructed maps of driving areas. The pre-constructed maps may support relative localization estimates. The system may cross reference localization packets with localization estimates performed by referencing the pre-constructed maps.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 5 is an example of a localization packet.

Figure 1:
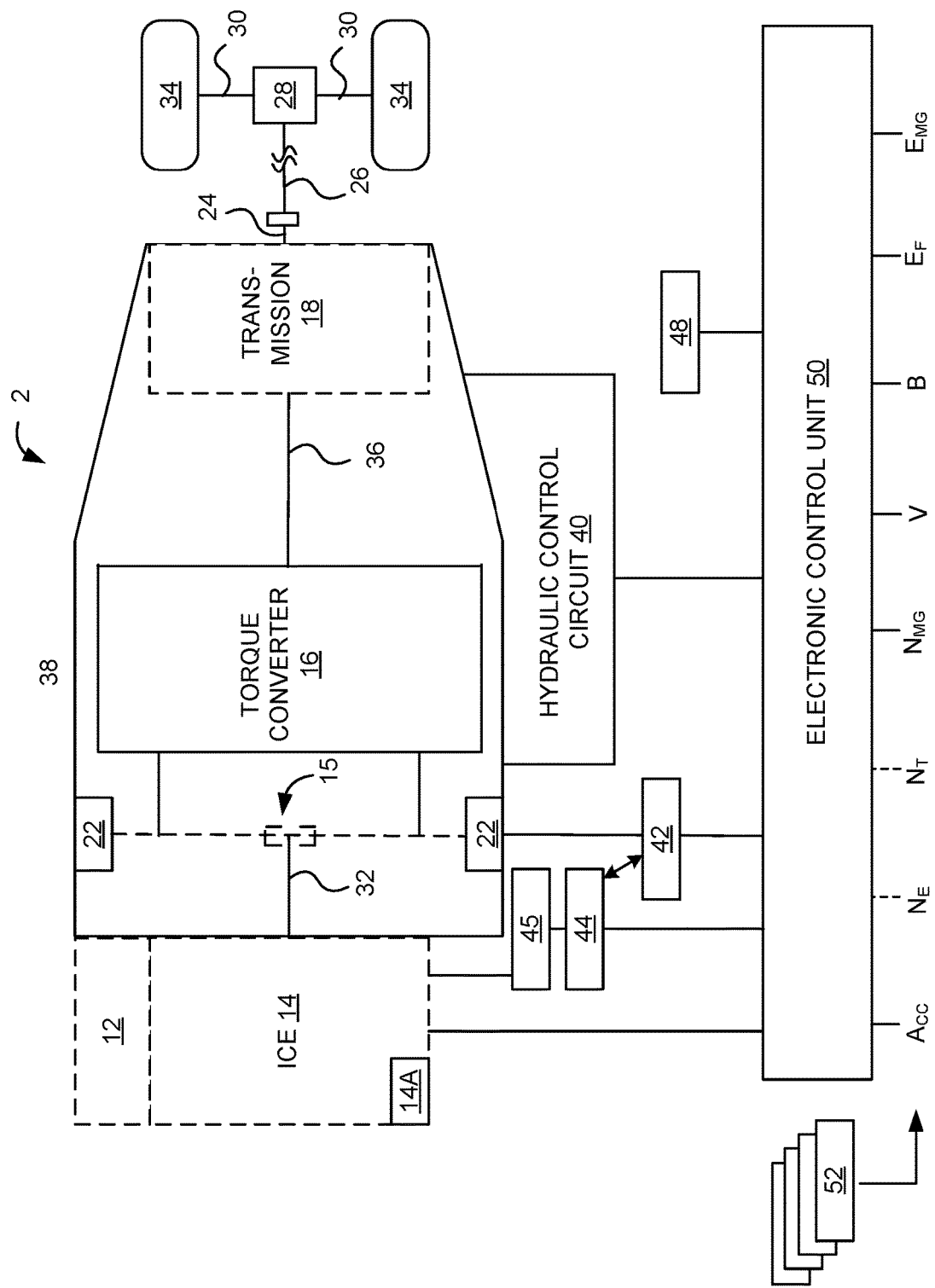
FIG. 1 is a schematic representation of an example hybrid vehicle with which embodiments of the systems and methods disclosed herein may be implemented.

The figures are not exhaustive and do not limit the present disclosure to the precise form disclosed.

DETAILED DESCRIPTION

Embodiments of the systems and methods disclosed herein are directed to improved localization accuracy of a vehicle. Localization may refer to both a vehicle or vehicles' position and orientation relative to a reference. Localization may refer to the position and/or orientation of a vehicle in a global reference frame. A global reference frame may be relative to a position on a map, such as the origin of a map. A global reference may also be relative to a position in the physical world, such as the center of the Earth. Accurate localization is important for several vehicle applications including navigation, advanced driver safety systems (ADAS), and autonomous driving. In particular, autonomous driving requires highly precise and localization in order to be effective and valuable.

The embodiments disclosed herein are directed to improved localization of a vehicle by leveraging localization estimates of a nearby vehicle or a plurality of surrounding vehicles. Specifically, the embodiments disclosed herein leverage the localization estimates of two or more vehicles that can perceive each other to improve one or more of the vehicles' localization estimates. Vehicles that can perceive each other may be located close to each other geographically, such as in the same physical driving area. Vehicles may have different orientations and positions relative to each other, such as head-on, parallel, following, adjacent, and other types of orientations. Vehicles may also move at different speeds relative to each other. For these reasons, the degree of accuracy with which a particular vehicle is capable of estimating the localization of another particular vehicle may vary.

In an embodiment, the systems and methods disclosed herein rely only on two or more vehicles' ability to perceive each other. Therefore, specialized infrastructure, such as RTK base stations and/or pre-constructed maps are not necessary in order to perform a highly accuracy localization. This may be advantageous in particular situations. For example, in one embodiment, vehicles may be traveling in a dense urban area, such as an "urban tunnel." Many vehicles and dynamic objects, such as pedestrians, bicycles, and other vehicles, may be present. Many vehicles may be available within a given area and may be able to perceive each other and to communicate with one another. However, satellite-based localization may be unavailable or inaccurate due to the obstruction and reflection of signals by some physical object or objects. For instance, a dense urban area with many dense and/or tall buildings, such as skyscrapers, may obstruct the signal. Additionally, such an area may undergo near constant development and up-to-date pre-constructed maps may not be available. Further, even if such maps do exist, due to the potential for signal obstruction, vehicles many not be able to access such maps in sufficient time to perform the kind of high accuracy localization needed for autonomous driving applications.

In another embodiment, the systems and methods for improving localization by leveraging nearby vehicle localization estimates may be combined with existing methods such as RTK base stations and/or pre-constructed maps. For example, vehicle may pass near an area with reduced signal. When the signal is unavailable, the nearby vehicle localization approach may be used but when vehicles are connected again, a pre-constructed map may be updated.

In an embodiment of the systems and methods disclosed herein, vehicles may exchange localization estimates anonymously. For instance, exchanged localization estimates may not include an absolute location of a vehicle in the physical world. Rather, localization packets may include a localization of estimate for a vehicle relative to a reference, such as the origin of a selected map. Therefore, when vehicles exchange localization packets, they exchange localization estimates relative to this point such that either vehicle is able to determine, assess, and improve a relative localization estimate but neither vehicle is estimating or storing an absolute location. This allows vehicles to employ the systems and methods disclosed herein anonymously.

In one embodiment, a subject vehicle or ego vehicle may improve a localization estimate for itself. The ego vehicle may be an autonomous vehicle. The ego vehicle may improve a localization estimate for itself by leveraging localization estimates of a nearby vehicle or surrounding vehicles. The ego vehicle may be equipped with advanced safety systems (ADAS). The ego vehicle may have the ability to estimate its location relative to a reference. The ego vehicle may also be able to communicate with other vehicles. A vehicle or vehicles nearby the ego vehicle may also be equipped with ADAS. The nearby vehicle or vehicles may also be able to estimate their locations relative to a reference. The nearby vehicle or vehicles may be able to communicate with other vehicles, including each other and/or the ego vehicle. In an embodiment, vehicles may communication through vehicle-to-vehicle (V2V) communications. In another embodiment, vehicles may communicate over wifi. In another embodiment, vehicles may alternatively or additionally communicate through vehicle-to-infrastructure (V2X) communication.

The ego vehicle and nearby vehicle and/or surrounding vehicles may be able to estimate locations relative to a global reference frame. A global reference frame may refer to vehicle localization relative to a selected point on a map. The selected point may be the origin of a coordinate system or any other point of interest on a coordinate system. The global reference frame may also refer to vehicle localization relative to a global location. For example, vehicle localization may be estimated relative to the center of the Earth. Vehicle localization may also be estimated relative to some other physical point selected on the Earth.

To improve a localization estimate for itself, a subject vehicle or ego vehicle may begin by estimating its own localization. The ego vehicle may estimate its own localization by estimating its vehicle coordinate frames relative to a global reference frame. Vehicle coordinate frames may be portions of a vehicle that can be detected from the outside of a vehicle. For example, vehicle coordinate frames may include the center of a vehicle's license plate. Vehicle coordinate frames may also include the center of a wheel of a vehicle or the center of an axle connecting two or more wheels.

After the ego vehicle has estimated its own localization, the ego vehicle may then identify a nearby vehicle and/or surrounding vehicles with which it is able to communicate. The ego vehicle may then estimate the location of the nearby vehicle and/or surrounding vehicles in the same way it estimated its own localization. Specifically the ego vehicle may estimate the location of the nearby vehicle or vehicles relative to the same global reference frame it used to estimate its own location. The ego vehicle may estimate vehicle coordinate frames of a nearby vehicle and/or surrounding vehicles relative to the global reference frame.

For example, the ego vehicle may estimate its own localization by estimate the center of its license plate relative to a selected coordinate location corresponding to the center of the city in which the ego vehicle is driving. The ego vehicle may perform the same estimate for a nearby vehicle and/or surrounding vehicles by estimating the center of the nearby vehicle and/or surrounding vehicles' license plate(s) relative to the same selected coordinate location corresponding to the center of the city in which the vehicles are driving.

The ego vehicle may perform additional localization estimates using additional vehicle reference frames. For example, the ego vehicle may repeat the above process for both itself and a nearby vehicle and/or surrounding vehicles using the center of a wheel as the vehicle reference frame instead. Repeated estimates with alternative selected vehicle reference frames may provide additional information regarding the position and location of a vehicle or vehicles.

The ego vehicle may then generate a localization packet based on the estimated locations of the vehicle coordinate frames for both the ego vehicle and the nearby vehicle and/or surrounding vehicles. A localization packet may include information that defines the vehicle coordinate frames. A localization packet may also identify the ego vehicle and proximate vehicle. For instance a localization packet may contain vehicle identification information. Vehicle identification information may be a registration plate number, a vehicle color, a vehicle make, a vehicle model, and/or any other identifying information associated with a vehicle. A localization packet may also include an estimate of the location of the vehicle coordinate frames for the ego vehicle and an estimate of the location of the vehicle coordinate frames for the proximate vehicle.

Next, the ego vehicle may transmit or broadcast a corresponding generated localization packet or packets to a nearby vehicle and/or surrounding vehicles. The ego vehicle may transmit the packet(s) using, for example V2V communications. Alternatively, the ego vehicle may transmit the packet(s) over Wi-Fi, if available.

A nearby vehicle and/or surrounding vehicles may estimate the localization of both themselves and the ego vehicle in the same way that the ego vehicle estimated the localization of the nearby vehicle and/or surrounding vehicles. The nearby vehicle and/or surrounding vehicles may generate a localization packet or localization packets for both the ego vehicle and/or themselves based on their localization estimates. The nearby vehicle and/or surrounding vehicles may then transmit the localization packet or localization packets to the ego vehicle using, for example, V2V communications or over Wi-Fi. The ego vehicle may then receive the localization packet and/or localization packets from the nearby vehicle and/or surrounding vehicles.

Next, the ego vehicle may refine its estimate of its own localization and/or the localizations of the nearby and/or surrounding vehicles based on the localization packet or packets generated by the nearby vehicle and/or surrounding vehicles. In an embodiment, all localization estimates are relative in that they are based on a global reference frame. Therefore, the ego vehicle, nearby vehicle, and/or surrounding vehicles need not be related.

In an embodiment, an ego vehicle and a plurality of nearby vehicles may perform and exchange localizations as discussed above. A determination may be made as to which vehicle, among the ego vehicle and nearby vehicles, is best equipped to accurately determine the vehicle coordinate frame of any given vehicle selected from the ego vehicle and plurality of nearby vehicles. In estimating the localization of a selected vehicle, this approach may then afford more weight to the estimate of the vehicle that is best equipped to make an accurate estimate of the localization of the selected vehicle. Different factors may influence whether a vehicle is able to make an accurate estimate including the type and sensitivity of sensors a vehicle is equipped with, the position of a vehicle relative to another vehicle, and therefore the ability of a vehicle to fully or partially observe another vehicle, the speed at which the vehicles are traveling relative to each other, and any other factor that may influence the accuracy of a localization estimate.

Additionally, over time, the vehicle that is best able to make an accurate estimate may change. This may be due to changing conditions, such as weather, or a change in a vehicle route or trajectory. Additionally, surrounding infrastructure and changes in the roadway may alter which vehicle is best able to observe any other given vehicle. The system may then, in real time, revise the weight afforded to the localization estimate to prioritize the estimates of the vehicles with the greatest accuracy capability. Constant localization updates may be achieved and transmitted to connected vehicles over V2V, V2X, and/or wifi.

In an embodiment, connected vehicles performing, exchanging, and refining localization estimates, as discussed above may be able to communicate with and be integrated with a broader infrastructure. For example, in additional to localization methods and systems discussed above, connected vehicles could integrate with an RTK system including satellites and base stations, or a pre-constructed map system, when available. Localization estimates could be cross referenced and/or updated depending on the availability of integrated systems.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for improving the localization accuracy of a vehicle can be implemented in other types of vehicle including gasoline- or diesel-powered vehicles, fuel-cell vehicles, electric vehicles, or other vehicles.

FIG. 1 illustrates a drive system of a vehicle 102 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 102 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MS}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 102 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{cc}$, proximity of nearby and/or surrounding vehicles, etc. Sensors 52 may also include cameras which may capture surroundings external to a vehicle.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, nearby vehicles, including the position and orientation of nearby vehicles, dynamic objects, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The examples of FIG. 1 are provided for illustration purposes only as examples of vehicle systems with which embodiments of the disclosed technology may be implemented. One of ordinary skill in the art reading this description will understand how the disclosed embodiments can be implemented with vehicle platforms.

Figure 2:
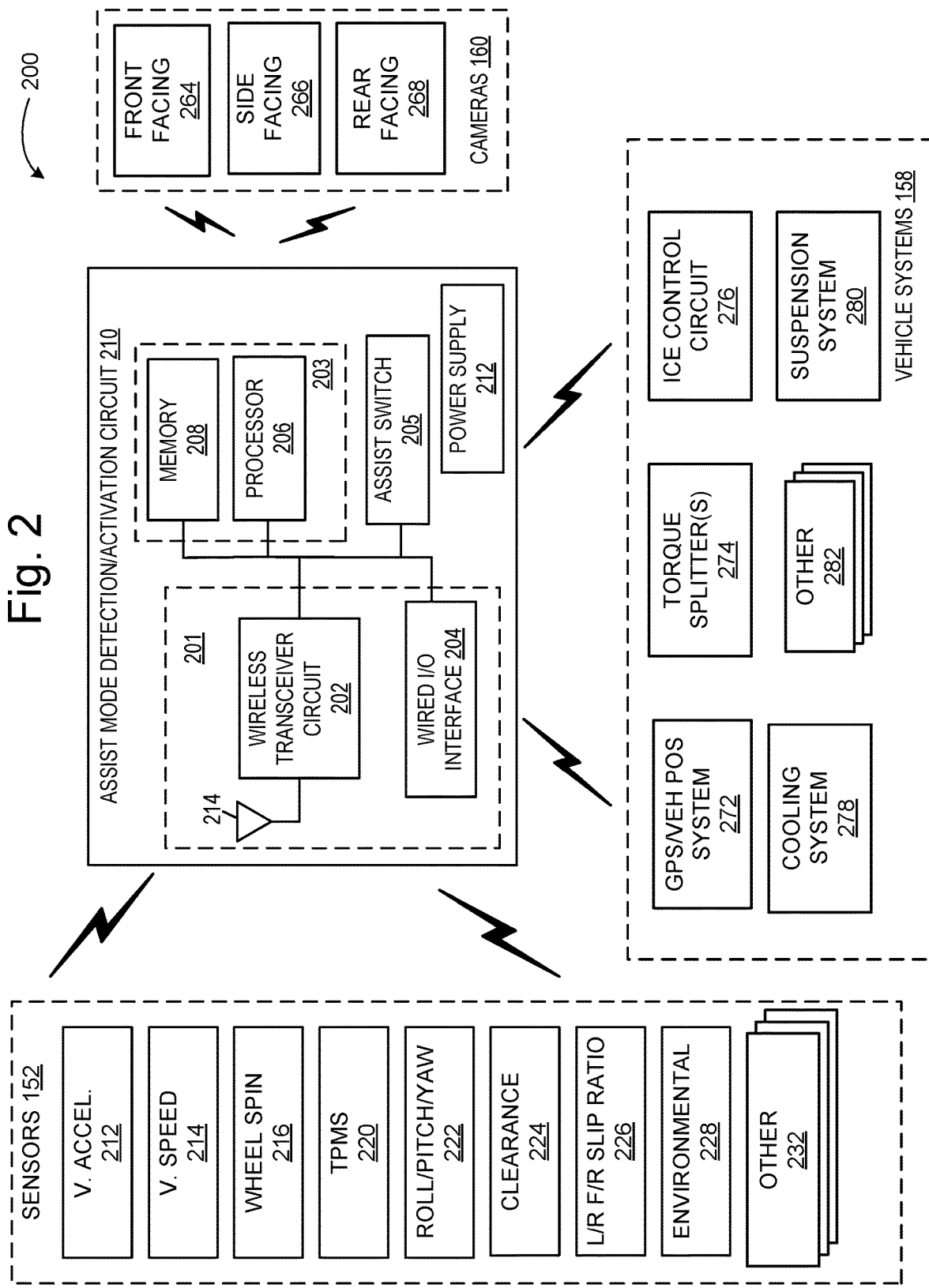
FIG. 2 illustrates an example architecture for leveraging localization estimates of surrounding vehicles to improve localization accuracy of a vehicle in accordance with one embodiment of the systems and methods described herein.

FIG. 2 illustrates an example architecture for improving vehicle localization accuracy in accordance with one embodiment of the systems and methods described herein. Referring now to FIG. 2, in this example, vehicle localization system 200 includes a localization improvement circuit 210, a plurality of sensors 152, and a plurality of vehicle systems 158. Sensors 152 and vehicle systems 158 can communicate with localization improvement circuit 210 via a wired or wireless communication interface. Although sensors 152 and vehicle systems 158 are depicted as communicating with localization improvement circuit 210, they can also communicate with each other as well as with other vehicle systems. Localization improvement circuit 210 can be implemented as an ECU or as part of an ECU such as, for example electronic control unit 50. In other embodiments, localization improvement circuit 210 can be implemented independently of the ECU.

Localization improvement circuit 210 in this example includes a communication circuit 201, a decision circuit (including a processor 206 and memory 208 in this example) and a power supply 212. Components of localization improvement circuit 210 are illustrated as communicating with each other via a data bus, although other communication in interfaces can be included. Localization improvement circuit 210 in this example also includes a manual assist switch 205 that can be operated by the user to manually select the assist mode.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to localization improvement circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a localization improvement circuit 210.

Communication circuit 201 either or both a wireless transceiver circuit 202 with an associated antenna 214 and a wired I/O interface 204 with an associated hardwired data port (not illustrated). As this example illustrates, communications with localization circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by localization improvement circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and NiH$_2$, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 52 can include additional sensors that may or not otherwise be included on a standard vehicle 10 with which the vehicle localization system 200 is implemented. In the illustrated example, sensors 152 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect salinity or other environmental conditions). Additional sensors 232 can also be included as may be appropriate for a given implementation of vehicle localization system 200.

Vehicle systems 158 can include any of a number of different vehicle components or subsystems used to control or monitor various aspects of the vehicle and its performance. In this example, the vehicle systems 158 include a GPS or other vehicle positioning system 272; torque splitters 274 they can control distribution of power among the vehicle wheels such as, for example, by controlling front/rear and left/right torque split; engine control circuits 276 to control the operation of engine (e.g. Internal combustion engine 14); cooling systems 278 to provide cooling for the motors, power electronics, the engine, or other vehicle systems; suspension system 280 such as, for example, an adjustable-height air suspension system, and other vehicle systems.

During operation, localization improvement circuit 210 can receive information from various vehicle sensors to prepare/refine a localization packet. Communication circuit 201 can be used to transmit and receive information between localization improvement circuit 210 and sensors 152, and localization improvement circuit 210 and vehicle systems 158. Also, sensors 152 may communicate with vehicle systems 158 directly or indirectly (e.g., via communication circuit 201 or otherwise).

In various embodiments, communication circuit 201 can be configured to receive data and other information from sensors 152 that is used in determining whether to prepare/refine a localization packet. Additionally, communication circuit 201 can be used to send an activation signal or other activation information to various vehicle systems 158 as part of preparing and/or refining a localization packet. A localization packet may be prepared/refined based on information detected by one or more vehicles sensors 152.

Specifically, a vehicle may be equipped with cameras 160. These may include front facing cameras 264, side facing cameras 266, and rear facing cameras 268. Cameras may capture information which may be used in preparing and/or refining a localization estimate. For example, a front facing camera 264 may capture the license plate of a proximate vehicle in front of a vehicle equipped with front facing camera 264. Additionally, sensors may estimate proximity between vehicles. For instance, in addition to capturing the license plate/license plate information, the camera may be used with and/or integrated with additional sensors such as LIDAR sensors or any other sensors capable of capturing a distance.

Figure 3:
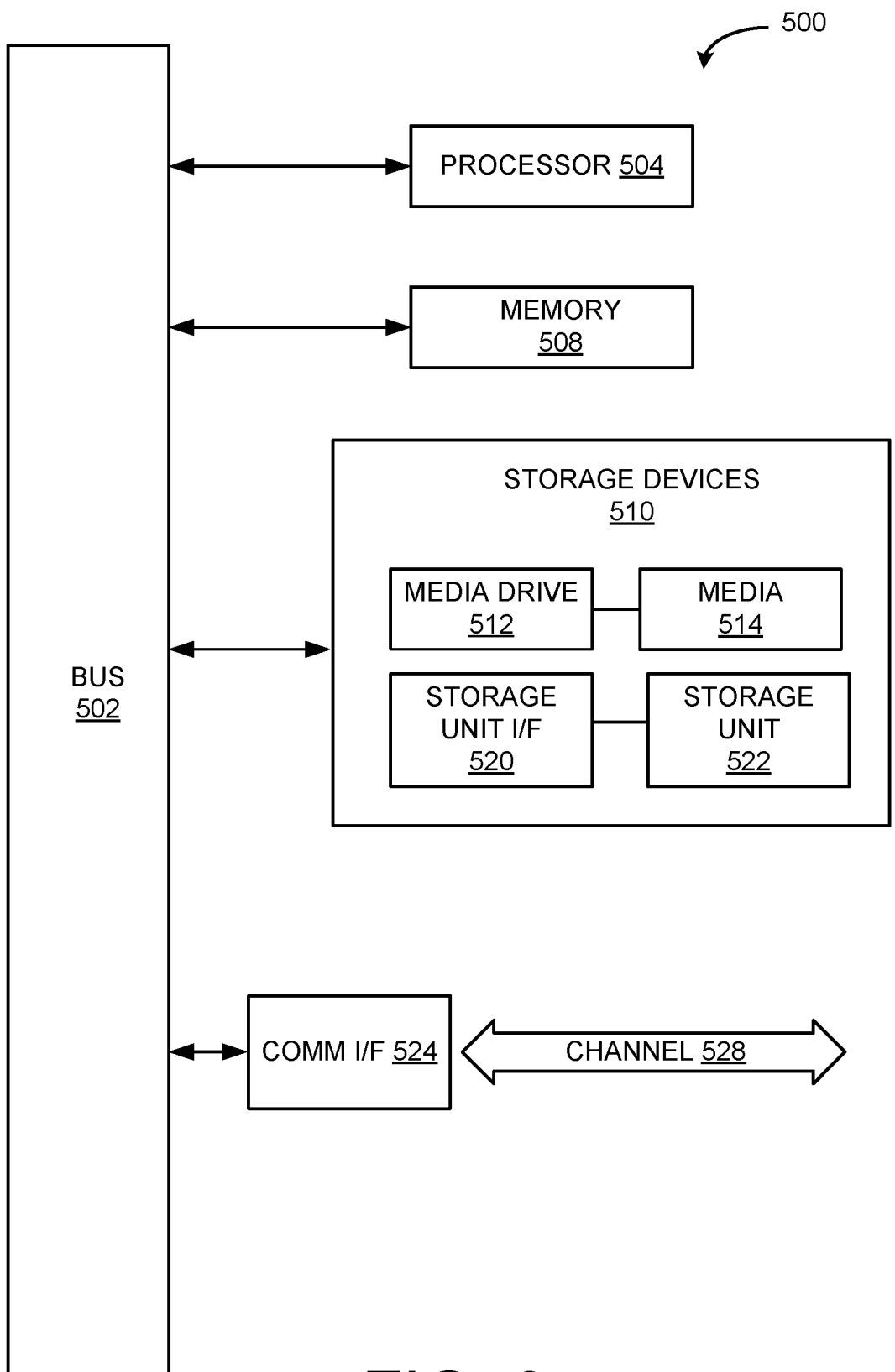
FIG. 3 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 3. Various embodiments are described in terms of this example-computing component 500. After reading this description, it will become apparent to a person skilled in the relevant art how to implement the application using other computing components or architectures.

Referring now to FIG. 3, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor, and/or any one or more of the components making up a user device, user system, and/or non-decrypting cloud service. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

Figure 4:
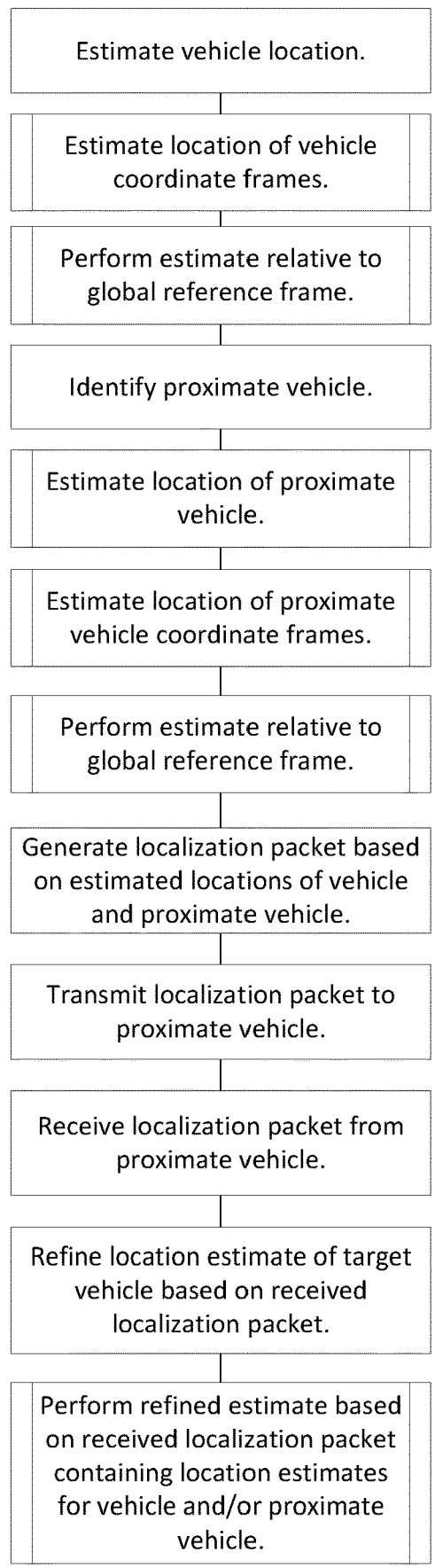
FIG. 4 is an example of a method for improving vehicle localization accuracy.

Referring now to FIG. 4, a method for improving the localization accuracy of a target vehicle may include exchanging location estimates with a proximate vehicle and merging the exchanged estimates to refine localization estimates.

For instance, as a first step 400, a subject vehicle or ego vehicle may first estimate its own location. This estimate may be of the location of selected vehicle coordinate frames of the ego vehicle. As a first sub-step 402 to the first step 400, the ego vehicle may estimate the location of vehicle coordinate frames for a target vehicle. For example, the center of the license plate of the ego vehicle may be the selected coordinate frame. Other possible vehicle coordinate frames, including the center of a wheel or axle, or any other externally viewable portion of the vehicle may also be selected. Selecting a vehicle coordinate frame and estimating the location of the vehicle coordinate frame enables a more precise and accurate estimate of the vehicle's location. As a second sub-step 404 to the first step 400, the estimate of the ego vehicle's coordinate frames may be performed relative to a global reference frame. A global reference frame may be the center of the Earth or any other selected point either on a coordinate plane or with a physical significance, for instance a landmark.

As a second step 406, an ego vehicle may then identify a proximate vehicle. The proximate vehicle may share a portion of the road with the ego vehicle and may be observable by the ego vehicle. The proximate vehicle may also be able to communicate with the ego vehicle and vice versa. As a first sub-step 408 to the second step 406, the ego vehicle may then estimate the location of the proximate vehicle. As a second sub-step 410 to the second step 406, the ego vehicle may perform the estimate of the location of the proximate vehicle by detecting the proximate vehicle's vehicle coordinate frame. For example, the ego vehicle may be equipped with cameras and/or proximity sensors, such as LIDAR sensors, and may be able to estimate the distance to the proximate vehicle from a reference point. As a third sub-step 412, to the second step 406, the ego vehicle may perform the estimate of the location of the proximate vehicle relative to a global reference frame. The global reference frame may be the same global reference frame relative to which the ego vehicle estimated its own location.

As a third step 414, the ego vehicle may then generate a localization packet based on its estimates for both the location of itself as well as the proximate vehicle. For example, the vehicle localization packet may include a global location estimate which may be the estimated location of the ego vehicle itself. The localization packet may also include a relative location estimate which may be the estimated location of the proximate vehicle. Both the global location estimate and the relative location estimate may include degrees of certainty. The degree of certainty with which the ego vehicle is able to perform an estimate may depend on many factors including the proximity of the ego vehicle to the proximate vehicle, the speed of travel of the ego vehicle and/or the proximate vehicle, and any other relevant factors.

As a fourth step 416, the ego vehicle may then transmit the generated localization packet to the proximate vehicle. As a fifth step 418, the ego vehicle may in turn receive a localization packet from the proximate vehicle. As a sixth step 420, the ego vehicle may then refine its localization estimates based on the localization packet received from the proximate vehicle. For example, in an embodiment, the ego vehicle may be the target vehicle. As a sub-step 422, to the sixth step 420, the ego vehicle may then refine its estimate for its own localization based on the information received from the proximate vehicle. In another embodiment, the proximate vehicle may be the target vehicle. The ego vehicle may then refine its estimate for the localization for the proximate vehicle based on the information received from the proximate vehicle.

Additionally, the ego vehicle and the proximate vehicle may be differently able to accurately determine a localization. For example, the ego vehicle may be able to estimate a localization with an uncertainty of 10 millimeters. However, the proximate vehicle may be able to estimate localization with an uncertainty of 1 millimeter. Because the proximate vehicle is better equipped to precisely and accurately estimate a localization, the ego vehicle may afford the proximate vehicle's localization more weight than its own localization estimates in refining its localization estimates.

In an embodiment, both the ego vehicle and the proximate vehicle may be able to estimate localization with an uncertainty at the millimeter level or better. Precise localization estimates achieved by the systems and methods disclosed herein offer advantageous over less precise methods. For instance, a precise estimate may support many desirable autonomous driving functions while a less precise estimate may only be suitable for navigation and similar functions.

In an embodiment, the entire estimate and refinement method is performed in real-time. Between the ego vehicle and the proximate vehicle, the vehicle best equipped to accurately estimate the localization may vary with changing circumstances. Therefore, updated real-time localization packets may be exchanged on a continuous basis and may leverage differently weighted localization estimates to provide a constant, accurate, real-time localization estimate of the target vehicle.

Referring now to FIG. 5, is an example of a localization packet 600. A localization packet 600 may include several types of information including vehicle coordinate frames 602, vehicle identification information 604, global reference frame information 606, a global location estimate 608, and a relative location estimate 610. Localization packet 600 may also contain any other useful information including additional information about other nearby vehicles and/or entities, information about nearby infrastructure, pre-constructed maps, roadway condition information, weather information, and any other information that may be useful.

Vehicle coordinate frames 604 include points on the vehicle that can be observed external to the vehicle such that a precise and accurate location estimate for the vehicle may be made. Vehicle coordinate frames may include, for example, the center of the license plate or registration plate of a vehicle, the center of a particular wheel, such as the front left or right or rear left or right wheel, the center of the axle of a wheel, the center of the front end or front bumper of a vehicle, the center of the rear end or rear bumper of a vehicle, the center of the vehicle lengthwise, or any other information that can be used to form an accurate and precise estimate of the location and orientation of the vehicle.

Vehicle identification information 604 includes any information that can be used to identify a particular vehicle and/or distinguish a vehicle from surrounding vehicles. Vehicle identification information 604 may include, for example, the license plate number of a vehicle, the VIN, the registration number, the year, make, and/or model of a vehicle, the color of a vehicle, the condition a vehicle is, the state in which a vehicle is registered, the number of axles the vehicle has, and any other information that may be used to identify the vehicle and/or distinguish it from other vehicles on the road.

Global reference frame 606 includes any selected frame that can serve as a relative reference for a vehicle location estimate. For example, a global reference frame 606 may include the center of the Earth, a physical landmark, the center of a particular city or county, any preselected location on a map, any preselected location on a coordinate plane, or any other selected point from which the location of the vehicle may be estimated.

A global location estimate 608 may be the location estimate for the ego vehicle itself. The global location estimate 608 may be expressed in coordinates relative to the global reference frame. The global location estimate 608 may be expressed as degrees, minutes, seconds, degrees and decimal minutes, decimal degrees, and/or in any other format that can accurate represent the localization of a vehicle relative to a global reference frame. The global location estimate 608 may also have an uncertainty level. The uncertainty level may indicate the degree of accuracy of the global location estimate 608. The uncertainty level may vary with varying circumstances. For instance, the uncertainty level may increase as vehicle speed increases in an embodiment. The global location as well as the associate uncertainty may both vary over time and accurate, precise, real-time estimates may be performed on a continuous basis.

A relative location estimate 610 may be the location estimate of the proximate vehicle. The relative location estimate 610 may be expressed in coordinates relative to the global reference frame. The relative location estimate 610 may be expressed as degrees, minutes, seconds, degrees and decimal minutes, decimal degrees, and/or in any other format that can accurate represent the localization of a vehicle relative to a global reference frame. The relative location estimate 610 may also have an uncertainty level. The uncertainty level may indicate the degree of accuracy of the relative location estimate 610. The uncertainty level may vary with varying circumstances. For instance, the uncertainty level may increase as vehicle speed increases in an embodiment. The relative location as well as the associate uncertainty may both vary over time and accurate, precise, real-time estimates may be performed on a continuous basis.

Note that while the ego vehicle may perform localization estimates for both itself and the proximate vehicle, the proximate vehicle may likewise perform estimates for both itself and the ego vehicle. Thus, from the proximate vehicle's perspective, the proximate vehicle is the ego vehicle. Therefore, the proximate vehicle's localization packet 600 may include a global location estimate 608 for itself as well as a relative location estimate 610 for the ego vehicle.

Figure 6:
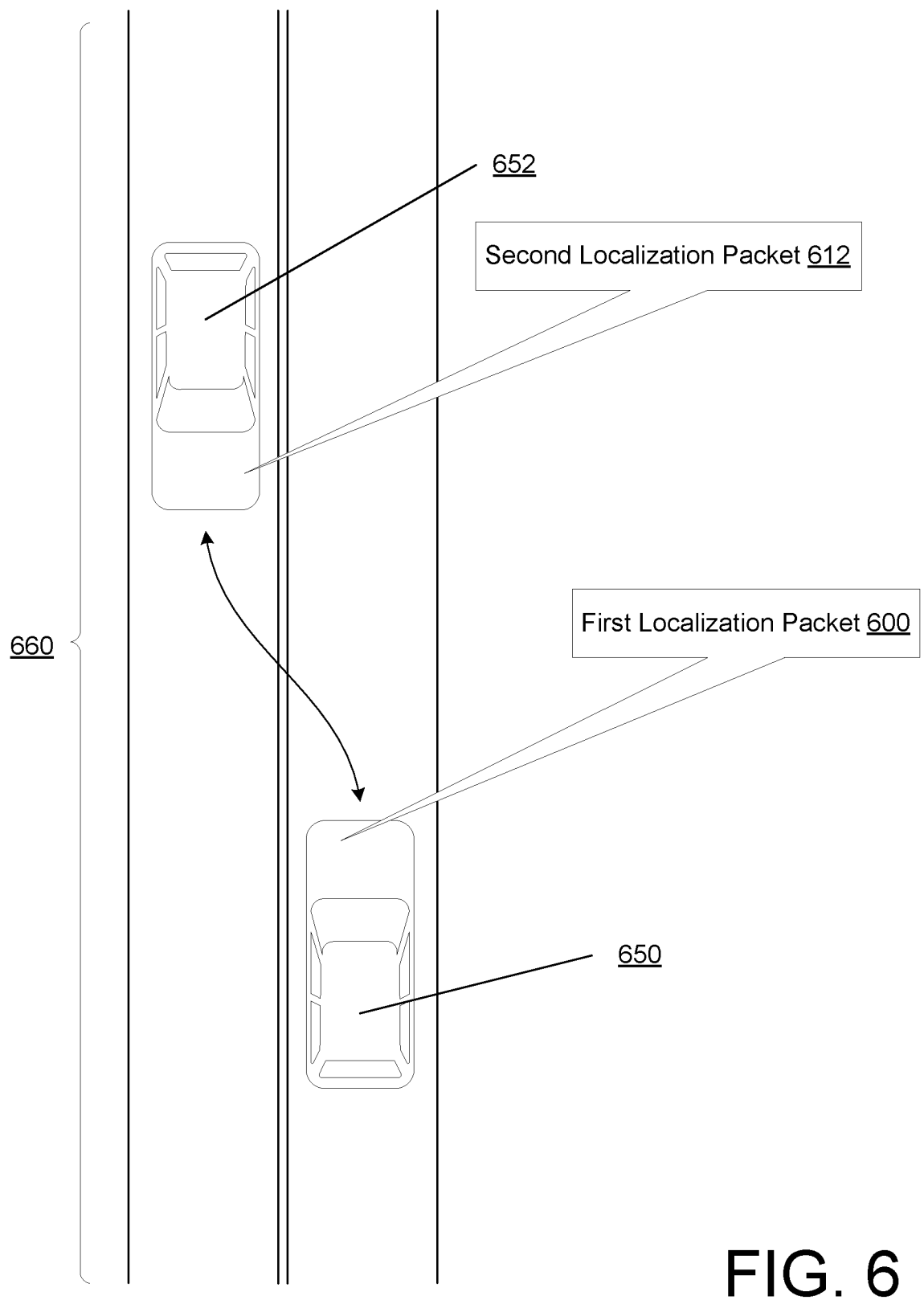
FIG. 6 is an example of localization improvement system including two vehicles.

Referring now to FIG. 6, an example of a system including an ego vehicle 650 and a proximate vehicle 652 is shown. The ego vehicle 650 may estimate its own location in accordance with the embodiments described herein. The ego vehicle may then identify the proximate vehicle 652. The ego vehicle and proximate vehicle may share a road region 660. The ego vehicle 650 may be able to observe the proximate vehicle 652. In FIG. 6, the ego vehicle 650 may be able to observe the proximate vehicle 652 head on. Other configuration, though not shown in FIG. 6, are also possible, these include side-by-side or adjacent or any other proximate configuration. The ego vehicle 650 may also be able to communicate with the proximate vehicle 652.

The ego vehicle 650 may be able to determine a vehicle reference frame for the proximate vehicle 652. For example, the ego vehicle 650 may be able to detect the center of the proximate vehicle's 652 license plate, using, for example, front facing cameras, LIDAR sensors, and/or any other cameras and/or sensors. The proximate vehicle 652 may in turn be able to determine a vehicle reference frame for the ego vehicle 650. For instance, the proximate vehicle 652 may likewise be able to detect the center of the ego vehicle's 650 license plate, using, for example, front facing cameras, LIDAR sensors, and/or any other cameras and/or sensors.

The ego vehicle 650 may transmit a localization packet 600 to the proximate vehicle 652 containing its own localization estimate, a localization estimate for the proximate vehicle 652 and any other relevant information including vehicle identification information. The proximate vehicle 652 may likewise transmit a localization packet 612 to the ego vehicle 650, containing an estimate of its own localization, an estimate of the ego vehicle's 650 localization, and any other relevant information, including vehicle identification information. Note that because the localization estimates are performed relative to a global reference frame, the ego vehicle and proximate vehicle need not reveal their absolute locations to each other to perform improved localizations, as discussed herein.

Figure 7:
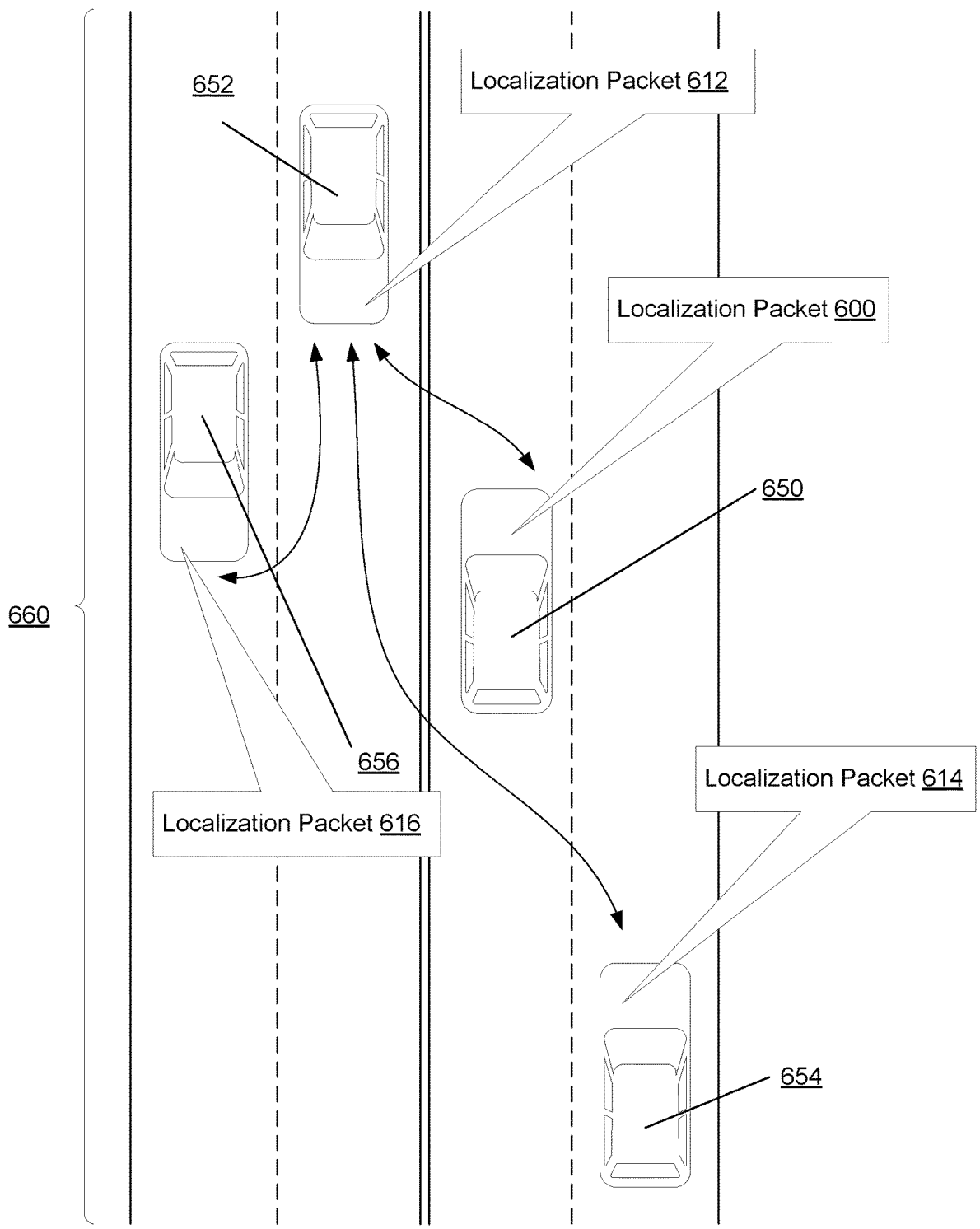
FIG. 7 is an example of a localization improvement system including multiple vehicles.

Referring now to FIG. 7, an example of a system including an ego vehicle 650 and a plurality of proximate vehicle 652, 654, 656 is shown. The ego vehicle 650 may estimate its own location in accordance with the embodiments described herein. The ego vehicle 650 may then identify the proximate vehicles 652, 654, 656. The ego vehicle 650 and proximate vehicles 652, 654, 656 may share a road region 660. The ego vehicle 650 may be able to observe the proximate vehicles 652, 654, 656. In FIG. 7, the ego vehicle 650 may be able to observe one of the proximate vehicles 652 head on. Another proximate vehicle 654 may be observable at the rear of the ego vehicle 650. Another proximate vehicle 656 may be diagonal and head on to the ego vehicle 650. Other configurations, though not shown in FIG. 7, are also possible. These include side-by-side or adjacent or any other proximate configuration. Additionally, though FIG. 7 shows three proximate vehicles 652, 654, 656, any other number of proximate vehicles is also possible. The ego vehicle 650 may also be able to communicate with the proximate vehicles 652, 654, 656.

The ego vehicle 650 may be able to determine vehicle reference frames for the proximate vehicles 652, 654, 656. For example, the ego vehicle 650 may be able to detect the center of proximate vehicle's 652, 656 license plate, using, for example, front facing cameras, LIDAR sensors, and/or any other cameras and/or sensors. In another example, the ego vehicle 650 may be able to detect the center of a proximate vehicle's 654 license plate, using, for example, rear facing cameras, LIDAR sensors, and/or any other cameras and/or sensors.

The proximate vehicles 652, 654, 656 may in turn be able to determine a vehicle reference frame for the ego vehicle 650. For instance, proximate vehicle 652, 654 may likewise be able to detect the center of the ego vehicle's 650 license plate, using, for example, front facing cameras, LIDAR sensors, and/or any other cameras and/or sensors. In another example, a proximate vehicle 656 may be able to detect the center of the ego vehicle's 650 license plate, using, for example, rear facing and/or side-facing cameras, LIDAR sensors, and/or any other cameras and/or sensors.

The ego vehicle 650 may transmit a localization packet 600 to the proximate vehicle 652 containing its own localization estimate, a localization estimate for the proximate vehicles 652, 654, 656 and any other relevant information including vehicle identification information. The proximate vehicles 652, 654, 656 may likewise transmit a localization packets 612, 614, 616 to the ego vehicle 650, containing estimates of their own localizations, estimates of the ego vehicle's 650 localization, and any other relevant information, including vehicle identification information. Note that because the localization estimates are performed relative to a global reference frame, the ego vehicle and proximate vehicles need not reveal their absolute locations to each other to perform improved localizations, as discussed herein.

As shown in FIG. 7, one embodiment of a system for improved vehicle localization may include multiple vehicles. Each vehicle may include an uncertainty for its localization estimates in its localization packet. Each vehicle's ability to accurately and precisely estimate its own location as well as the locations of proximate vehicles may vary. As such, the uncertainty estimates for each global and/or relative location for each vehicle may vary. Additionally, a vehicle's ability to accurately estimate localization may be static. For example, a vehicle may be equipped with older and/or less sensitive sensors and cameras which may impeded its ability to accurately estimate localization. However, a vehicle's ability to accurately estimate localization may also vary with changing circumstances. Therefore, at any point in time, the vehicle among the plurality of vehicles best equipped to accurately estimate the localization of any other vehicle may vary.

Therefore, a system and/or method for improving localization accuracy may include a weighted estimate giving the estimate(s) of the vehicle best equipped to accurately measure localization the most weight and giving the vehicle least equipped to accurately measure localization the least weight. Since the vehicle best equipped to accurately measure localization may change over time, the system/method may in real-time continuously update localization packets and estimates and make continuously refine an estimate of a target vehicle in real-time. This type of real-time, high accuracy localization estimate may be extremely sensitive and may achieve localization estimates to a 1 meter or better level of certainty. This type of precise localization estimate may support autonomous driving functions and application.

In an embodiment, the method and systems disclosed herein may be used independently. For example, they may be used in an uncharted urban tunnel area where GPS-based methods may fail due to lack of signal and pre-constructed map methods may fail due to a lack of pre-constructed map. However, in another embodiment, the systems and methods disclosed herein may be integrated with a GPS, RTK, and/or satellite based methods and/or with a pre-constructed map-based localization methods. For example, localization estimates may be shared with surrounding infrastructure and/or other vehicles via Wi-Fi, V2V, and/or V2X communication methods or other communication methods where available. Additionally, pre-constructed map and/or satellite-based localization estimates may serve as a reference and/or refinement tool for localization estimates.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:
1. A method for improving localization accuracy of a target vehicle comprising:
estimating location of a vehicle coordinate frame for a first vehicle relative to a global reference frame;
identifying a second vehicle proximate to the first vehicle;
estimating location of a vehicle coordinate frame for the second vehicle relative to the global reference frame;

generating a first localization packet based on the estimated location of the vehicle coordinate frame for the first vehicle and the estimated location of the vehicle coordinate frame for the second vehicle;
receiving a second localization packet from the second vehicle, wherein the second localization packet is generated by the second vehicle based on the second vehicle estimating location of the vehicle coordinate frame for the first vehicle and the second vehicle estimating location of the vehicle coordinate frame for the second vehicle;
weighting the first localization packet and the second localization packet by affording greater weight to the localization packet of the vehicle better equipped to determine a vehicle coordinate frame of the target vehicle; and
refining an estimate of location of the target vehicle based on the weighted first localization packet and weighted second localization packet.

2. The method of claim 1, wherein the target vehicle is the first vehicle and wherein refining the estimate of the location of the target vehicle further comprises refining the estimate of the vehicle coordinate frame for the first vehicle relative to the global reference frame based on the received second localization packet.

3. The method of claim 1, wherein the target vehicle is the second vehicle and wherein refining the estimate of the location of the target vehicle further comprises refining the estimate of the vehicle coordinate frame for the second vehicle relative to the global reference frame based on a third localization packet received from a proximate vehicle.

4. The method of claim 1, wherein the vehicle coordinate frame for the first vehicle comprises the center of the first vehicle's license plate.

5. The method of claim 1, wherein the vehicle coordinate frame for the first vehicle comprises the center of the first vehicle's wheel.

6. The method of claim 1, wherein the global reference frame comprises the origin of a selected coordinate plane.

7. The method of claim 1, wherein the global reference frame comprises the center of the Earth.

8. The method of claim 1, further comprising:
transmitting the generated first localization packet to the second vehicle.

9. The method of claim 8, wherein transmitting the generated first localization packet to the second vehicle comprises transmitting the generated first localization packet using Wi-Fi.

10. The method of claim 8, wherein transmitting the generated first localization packet to the second vehicle comprises transmitting the generated first localization packet using vehicle-to-vehicle (V2V) communications.

11. The method of claim 1, further comprising:
transmitting the refined estimate of the location of the target vehicle in real-time to connected vehicles.

12. A vehicle comprising:
one or more processing resources; and
non-transitory computer-readable medium, coupled to the one or more processing resources, comprising stored therein instructions that when executed by the one or more processing resources, cause the vehicle to:
estimate location of a vehicle coordinate frame for the vehicle relative to a global reference frame;
identify a second vehicle proximate to the vehicle;
estimate location of a vehicle coordinate frame for the second vehicle relative to the global reference frame;
generate a first localization packet based on the estimated location of the vehicle coordinate frame for the vehicle and the estimated location of the vehicle coordinate frame for the second vehicle;
receive a second localization packet from the second vehicle, wherein the second localization packet is generated by the second vehicle based on the second vehicle estimating location of the vehicle coordinate frame for the first vehicle and the second vehicle estimating location of the vehicle coordinate frame for the second vehicle;
weight the first localization packet and the second localization packet by affording greater weight to the localization packet of the vehicle better equipped to determine a vehicle coordinate frame of a target vehicle; and
refine an estimate of location of the target vehicle based on the weighted first localization packet and weighted second localization packet.

13. The vehicle of claim 12, wherein the target vehicle is the vehicle and wherein refining the estimate of the location of the target vehicle further comprises refining the estimate of the vehicle coordinate frame for the first vehicle relative to the global reference frame based on the received second localization packet.

14. The vehicle of claim 12, wherein the target vehicle is the second vehicle and wherein refining the estimate of the location of the target vehicle further comprises refining the estimate of the vehicle coordinate frame for the second vehicle relative to the global reference frame based on a third localization packet received from a proximate vehicle.

15. The vehicle of claim 12, wherein the vehicle coordinate frame for the second vehicle comprises the center of the second vehicle's license plate.

16. The vehicle of claim 12, wherein the vehicle coordinate frame for the second vehicle comprises the center of the second vehicle's wheel.

17. The vehicle of claim 12, wherein the global reference frame comprises the origin of a selected coordinate plane.

18. The vehicle of claim 12, wherein the global reference frame comprises the center of the Earth.

19. The vehicle of claim 12, wherein the non-transitory computer-readable medium comprises further instructions, that when executed by the one or more processing resources, cause the vehicle to:
transmit the generated first localization packet to the second vehicle.

20. A vehicle comprising
one or more processing resources; and
non-transitory computer-readable medium, coupled to the one or more processing resources, comprising stored therein instructions that when executed by the one or more processing resources, cause the vehicle to:
estimate location of a vehicle coordinate frame for a second vehicle relative to a global reference frame;
identify a third vehicle proximate to the second vehicle;
estimate location of a vehicle coordinate frame for the third vehicle relative to the global reference frame;
generate a first localization packet based on the estimated location of the vehicle coordinate frame for the second vehicle and the estimated location of the vehicle coordinate frame for the third vehicle;
receive a second localization packet from the second vehicle, wherein the second localization packet is generated by the second vehicle based on the second vehicle estimating location of the vehicle coordinate frame for the second vehicle and the second vehicle estimating location of the vehicle coordinate frame for the third vehicle;

weight the first localization packet and the second localization packet by affording greater weight to the localization packet of the vehicle better equipped to determine a vehicle coordinate frame of a target vehicle; and refine an estimate of location of the target vehicle based on the weighted first localization packet and weighted second localization packet.

* * * * *